Figure 1:
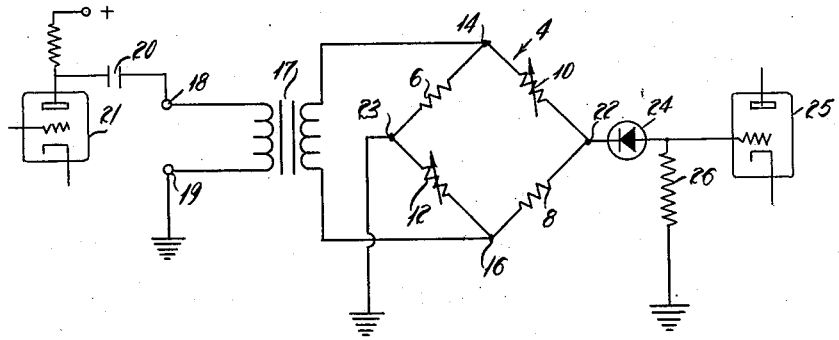

Feb. 26, 1963 A. I. STIEBEL 3,079,595
MULTI-CHANNEL SIGNAL TRANSMISSION SYSTEM
Filed June 9, 1958

INVENTOR.
ARIEL I. STIEBEL
BY
Strauch, Nolan & Neale
ATTORNEYS

United States Patent Office 3,079,595
Patented Feb. 26, 1963

3,079,595
MULTI-CHANNEL SIGNAL TRANSMISSION
SYSTEM
Ariel I. Stiebel, Detroit, Mich., assignor to Rockwell-Standard Corporation, Coraopolis, Pa., a corporation of Pennsylvania
Filed June 9, 1958, Ser. No. 740,857
7 Claims. (Cl. 340—183)

The present invention relates to multi-channel electrical signal transmission systems for supplying signals from a plurality of sources to a single indicating device, and more particularly to improvements in switching circuits for low amplitude signals.

In systems for transmitting data from instantaneous readings of instruments such as strain gauges, accelerometers, thermometers, and the like on devices such as vehicles or aircraft during dynamic test conditions, signals are collected from several instruments and fed into a single output channel for selective indication. The specific characteristics of such transmission systems are largely governed by the number and character of the signals to be transmitted, the speed at which they are sampled and the means by which the signals are indicated.

When high switching speeds are required, mechanical commutations are wholly inadequate for mechanical reasons as well as because of the imparted "noise" inherent in such commutators which obscures low amplitude signals. A certain minimum noise level is also present even in electronic switching systems which decreases the sensitivity of apparatus to weak signals which inherently must pass through a null point of zero voltage.

A principal object of the present invention is to provide a pulse switching system which is totally free of noise produced by the commutator or switching device to achieve accurate readings of extremely low amplitude signals from the various measuring instruments.

Another object of this invention is to provide a novel multi-channel transmission system where measuring instruments are connected to individual bridge circuits to which pulses are selectively applied in a predetermined sequence and frequency. The output voltages or signals from the bridge circuit are then amplified and sampled in a single indicating device without further switching after passing through the measuring instrument.

A further object of this invention is to provide a method of selectively switching pulses which are of relatively high amplitude for triggering charging circuits to produce pulses which are applied to bridge circuits for modulation in accordance with the desired condition or phenomenon to be measured rather than switching the low-amplitude output voltages from the bridge circuits. By using this method, any inherent noise in the switching system is completely isolated from the bridge circuits thereby making possible the accurate measurement of output signals from the bridge circuits, which when the bridge is balanced, are of zero amplitude.

By means of the novel electronic pulse switching system of the present invention, as many as 10 or even more bridge circuits may be connected to the single indicating means and the speed at which the pulses can be switched is not a limiting factor. As only one bridge circuit is energized at a time, no interference can exist between the various condition responsive devices which serve as the pick-up elements.

Still a further object of the present invention is the provision of a novel circuit arrangement utilizing an electron beam switching tube as a source of signals for selectively energizing the different channels in a multi-channel transmission system having a single output channel and common indicator on which the output signals appear as pulses of varying amplitude and in the same sequence to be viewed simultaneously.

Figure 2:
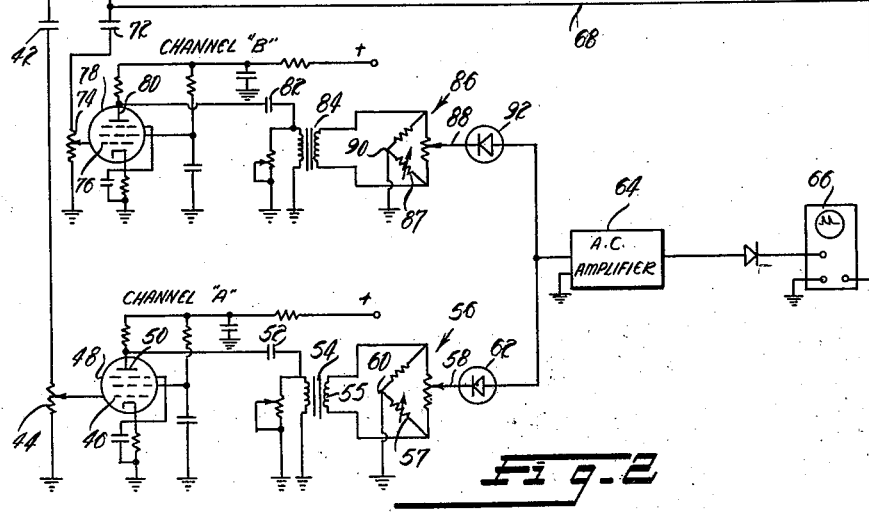

Other objects and features of this invention will become apparent from the following description and claims, and from the appended drawings, wherein:

FIGURE 1 represents a commonly known bridge circuit of the Wheatstone type with the input and output terminals shown adapted for use in the apparatus of the present invention; and FIGURE 2 is a circuit diagram of a multi-channel indicating apparatus illustrating the present invention.

Referring now to FIGURE 1, the apparatus according to the present invention comprises a conventional Wheatstone type bridge circuit 4 consisting of two fixed resistors 6 and 8, a balancing variable resistor 10 and a further resistor 12, the resistance of which varies in accordance with a variation in the condition or phenomenon to be measured. The present invention will be described in connection with a system whereby resistor 12 is a strain gauge which is of a known type available commercially. Strain gauge 12 is adapted to be placed on an object undergoing dynamic tests at various critical locations and the change of resistance of strain gauge 12 controls the unbalance of bridge circuit 4.

Bridge circuit 4 has input terminals 14 and 16 connected to the secondary winding of transformer 17 having primary winding terminals 18 and 19. The primary winding of transformer 17 is energized during the charging of capacitor 20 which occurs when the conduction in a normally conducting tube 21 is momentarily cut off, thereby producing a pulse in the secondary winding of transformer 17 which is applied to input terminals 14 and 16 of bridge 4. If bridge 4 is balanced, no output voltage appears between output terminals 22 and 23. However, if the bridge is unbalanced, an output voltage appears across output terminals 22 and 23, the magnitude of which is proportional to the degree of unbalance caused by the change in resistance of the strain gauge 12.

Diode 24 is connected with one terminal to output terminal 22 of bridge 4 and the other terminal to the input grid of amplifying tube 25 and to resistor 26 which may be connected to ground. Diode 24 serves as a decoupling element and when connected with the anode or positive terminal to bridge terminal 22, only positive going pulses are transmitted to amplifying tube 25 while negative going pulses are discarded.

The bridge output voltage, which consists of a series of pulses varying in amplitude in accordance with the unbalance occurring in the bridge circuit, serves as a signal voltage which, as will be explained below, is used to provide the indications which are observed as a measurement of the magnitude of the condition or phenomenon under observation. In the particular application herein described using strain gauges, the output from several strain gauges provides a source of measurements which may be viewed simultaneously in the form of signals varying in amplitude in accordance with the change in the strain detected by the strain gauges on the screen of a conventional cathode ray tube oscilloscope in the circuit of FIGURE 2 described below.

In the actual apparatus as used, several bridge circuits are provided with a high frequency multi-channel transmitting system for supplying output signals into a common indicating device for utilization. Where permanent records of quantitative measurements are not required, it has been found convenient to use the conventional cathode ray tube oscilloscope as an indicating device because of the ease of viewing the outputs of 10 or even more separate bridge circuits simultaneously. By applying pulses of preselected frequency in a predetermined sequence to each bridge circuit successively, the output voltage of signals from each bridge circuit will appear on the screen of the cathode ray tube oscilloscope in the same sequence forming an indication from which the parts subjected to maximum vibration or strain can be readily identified.

One principal difficulty in providing a system of this type is that the continuous switching over from one signal channel to the next signal channel inherently produces noise. Since the amplitude of the signal output from a balanced bridge is zero and may vary through only a relatively small range of amplitude, the usefulness of the apparatus is dependent upon a very low noise background so that a maximum signal-to-noise ratio is obtained.

Thus, one important feature of the present invention is to provide means for switching the applied pulses to the various bridges which are of a high, substantially constant amplitude rather than switching the low level output signals from the various bridges. By this technique, the inherent noise produced by the pulse switching device will not affect the output from the bridge circuits.

Referring now to FIGURE 2, one embodiment of the present invention is disclosed where it is desired to view simultaneously the output signals from several bridge circuits each containing a separate strain gauge in the form of pulses varying in amplitude on the screen of an oscilloscope. To simplify the explanation of the system, only two strain gauge bridge circuits are shown, although with this particular embodiment 10 strain gauges mounted at different positions on an automative frame or chassis may be used and the relative readings compared simultaneously on an oscilloscope.

An oscillator or signal generator 30 which may be of any suitable type providing a sine wave output having a frequency of for example 8 kc. is connected through transformer 32 which has a secondary winding center tap connected by lead 33 to a voltage divider and opposite terminals thereof connected to the odd and even grids 34 and 36 respectively of an electron beam switching tube 38. Beam switching tube 38 is commercially available and may be of the type having a tube Number 6700 sold by Burroughs Corporation. The sine wave signal from transformer 32 causes the electron beam in tube 38 to rotate in a known manner to successively contact several consecutive positions A, B, . . . J. The speed of rotation of the beam is controlled by the frequency of oscillator 30.

When the beam contacts position "A" a voltage drop occurs across resistor 40 which is connected to B+ through lead 39. A coupling condenser 42 then discharges through potentiometer 44, the adjustable arm of which is connected to grid 46 of a normally conducting pentode tube 48, driving grid 46 negative and therefore causing current conduction in tube 48 to cut off during the period of the electron beam conduction at position A. The voltage at plate 50 then goes positive and causes condenser 52 to charge through a circuit including the primary winding of a transformer 54. This charging current induces a voltage pulse in the secondary winding 55 connected to bridge circuit 56 corresponding to the signal channel having strain gauge "A." The current pulse applied to bridge 56 will produce a zero voltage output between terminals 58 comprising the movable arm of a balancing potentiometer and ground terminal 60 if the resistances in the bridge are balanced. If the resistance of strain gauge 57 changes causing an output voltage pulse to appear between the output terminals 58 and 60, this output voltage or signal will be coupled through isolation diode 62 into a suitable A.C. amplifier 64 which may be of conventional construction. The amplified pulses are applied preferably to the vertical deflection plates of a cathode ray tube of an oscilloscope 66 to appear as vertical lines on a horizontal sweep.

At the next instant the beam of the beam switching tube 38 contacts position "B." Tube 48 in channel "A" returns to its normally conducting state, and the polarity of diode 62 is such as to discard any oppositely poled signal which may then be produced by the bridge circuit 56.

When the beam in tube 38 is at position "B" a voltage drop occurs across a resistor 70 causing the discharging of a condenser 72 connected to a potentiometer 74 which drives the grid 76 of a pentode tube 78 negative and therefore the pentode itself into a non-conducting condition. The resulting voltage at plate 80 causes capacitor 82 to charge through a circuit including the primary winding of a transformer 84 which induces a voltage in the secondary winding connected to a bridge circuit 86 corresponding to the signal channel having the strain gauge "B." The induced voltage in transformer 84 causes a current pulse to be applied to bridge 86. The output voltage, when the bridge is unbalanced, appears between terminals 88 on the balancing potentiometer and ground terminal 90. This output voltage from bridge 86 is also coupled through isolation diode 92 into the common A.C. amplifier 64 from which the amplified pulses are again applied to the same deflection plates of the cathode ray tube in oscilloscope 66.

A horizontal sweep synchronization signal is provided on lead 68 which is connected to a convenient terminal on pulse switching tube 38 so that the horizontal sweep is synchronized with the frequency of rotation of the electron beam in tube 38. Thus the output pulses from bridge 86 corresponding to channel "B" appear shifted in position along the horizontal trace from the position of the first pulse in channel A from bridge 56.

The complete apparatus contains 8 additional signal channels corresponding to positions "C" through "J," each of which is identical to the signal channels identified as "A" and "B" shown in FIGURE 2 containing separate strain gauges 57 and 87 respectively. The output pulse from each bridge circuit is displayed on the oscilloscope screen at a position shifted along the horizontal sweep by an amount corresponding with the time of occurrence of its respective energizing pulse in beam switching tube 38. Thus the relative horizontal position of the pulses on the oscilloscope pattern identifies the particular strain gauge which in turn identifies the part or location of the object tested which is subjected to a strain, the magnitude of which is indicated on the face of oscilloscope 66.

The magnitude of the pulses applied to each bridge circuit is easily adjusted by a variable resistor connected in parallel to the primary winding of the transformer so that the relative sensitivities of the several bridge circuits are controlled to be substantially identical, or of a desired relative magnitude as may be required in a particular installation.

Since only one bridge circuit is energized at a time, no interference occurs between the various strain gauges or the separate strain gauge circuits, and all pulse indications are easily read simultaneously on the screen of the oscilloscope. The polarity of the several diodes is such that each bridge circuit is isolated from the other and the number of bridge circuits does not affect the input impedance to amplifier 64.

Any inherent noise from the switching device is effectively prevented by the present invention from entering the bridge circuits because the output signals from switching tube 38 are used simply as a triggering signal and not as a pulse which is subsequently fed to the bridge circuit. This is possible because pentode tube 48 in channel "A" and the corresponding pentode tubes in each of the other channels causes the actual pulse applied to the bridge circuit to be formed by a passive circuit connected to the power supply voltage terminal including the primary of transformer 54 and capacitor 52 and therefore is completely independent of the magnitude of and/or noise associated with the switching signal from switching tube 38. The amplification provided, therefore, is of such nature as to establish an extremely high signal-to-noise ratio that makes the apparatus of the present invention ideally suited as a switching system for low amplitude signal systems.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Apparatus for producing indications of a variable condition from a plurality of sources exhibiting said variable condition comprising a separate bridge circuit for each of said sources, a condition responsive device having an electrical impedance which varies in accordance with a variation of said condition positioned at each of said plurality of sources, means connecting one of said condition responsive devices in each bridge circuit, means for producing a series of control signals having a predetermined repetition rate with successive signals occurring at separate output terminals, means connecting different ones of said separate output terminals to different ones of said separate bridge circuits to selectively energize said bridge circuits in a predetermined sequence with pulses of controlled amplitude, indicator means for producing an indication which varies with the amplitude of individual input pulses, and circuit means including a diode for connecting output terminals from each of said bridge circuits directly to common input terminals on said indicator means for producing in a sequential manner indications of the variable condition at each of said sources.

2. Apparatus for producing indications of a variable condition from a plurality of sources exhibiting said variable condition comprising a separate bridge circuit for each of said sources, a condition responsive device having electrical impedance which varies in accordance with a variation of said condition positioned at each of said plurality of sources, means connecting one of said condition responsive devices in each bridge circuit, means for producing a series of control signals having a predetermined repetition rate with successive signals occurring at separate output terminals, means connecting different ones of said separate output terminals to different ones of said separate bridge circuits to selectively energize said bridge circuits in a predetermined sequence including a pulse forming circuit for producing pulses of controlled amplitude in response to receipt of one of said control signals, an oscilloscope for producing an indication which varies with the amplitude of individual input pulses, circuit means for connecting output terminals from each of said bridge circuits directly to common input terminals on said oscilloscope whereby the signal amplitude from each bridge circuit is applied to a single circuit without individual amplification thereof for producing in a sequential manner indications of the variable condition at each of said sources, and means connected to one of said output terminals on said control signal producing means for synchronizing the scanning frequency of the oscilloscope with the repetition rate of said control signal producing means to produce an image containing an indication from a plurality of said bridge circuit during each scanning cycle of said oscilloscope.

3. Apparatus for producing indications of a variable condition from a plurality of sources indicating said variable condition comprising a separate bridge circuit for each of said sources, a condition responsive device having an electrical impedance which varies in accordance with a variation of said condition positioned at each of said plurality of sources, means connecting one of said condition responsive devices in each bridge circuit, means for producing a series of control signals having a predetermined repetition rate with successive signals occurring at separate output terminals, circuit means connecting different ones of said separate output terminals to different ones of said separate bridge circuits to selectively energize said bridge circuits in a predetermined sequence including a normally conducting electron device associated with each separate output terminal, a capacitor connected to said electron device to be charged through a transformer when conduction in said electron device is cut off, means connecting said transformer to apply a pulse to said bridge circuit when said capacitor is charged, pulse responsive means for producing an indicaton which varies with the amplitude of individual input pulses, and circuit means including an isolation diode connecting output terminals from each of said bridge circuits to common input terminals of said pulse responsive means for producing in a sequential manner comparative indications of the variable condition at each of said sources.

4. Apparatus for producing indications of a variable condition from a plurality of sources exhibiting said variable condition comprising a separate bridge circuit for each of said sources, a condition responsive device having an electrical impedance which varies in accordance with the variation of said condition positioned at each of said plurality of sources, means connecting one of said condition responsive devices in each bridge circuit, means for producing a series of control signals having a predetermined repetition rate with successive signals occurring at separate output terminals, means including a passive network connected to said separate output terminals for producing pulses of uniform amplitude and connected to different ones of said separate bridge circuits to selectively energize said bridge circuits in a predetermined sequence, indicator means for producing an indication which varies with the amplitude of input pulses, and means including an isolating circuit element associated with each of said bridge circuits for connecting output terminals from each of said bridge circuits directly to common input terminals on said indicator means whereby the signal amplitude from each bridge circuit is applied to a single circuit without individual amplification thereof for producing in a sequential manner indications of the variable condition at each of said sources.

5. Apparatus for producing indications of a variable condition from a plurality of sources exhibiting said variable condition comprising a separate bridge circuit for each of said sources, a condition responsive device having an electrical impedance which varies in accordance with the variation of said condition positioned at each of said plurality of sources, means connecting one of said condition responsive devices in each bridge circuit, means for producing a series of control signals having a predetermined repetition rate with successive signals occurring at separate output terminals, a separate signal channel connected to each of said output terminals, each of said signal channels containing one of said bridge circuits and a pulse forming circuit for producing pulses of uniform amplitude in response to receipt of one of said control signals to selectively energize said bridge circuits in a predetermined sequence, indicator means for producing an indication which varies with the amplitude of input pulses, and circuit means including an isolation diode connecting the output terminals of each bridge directly to common input terminals on said indicator means for producing in a sequential manner indications of the variable condition at each of said sources.

6. In combination: a source of substantially constant frequency signals; distributor means connected to said signal source and having a plurality of output terminals for producing control signals on one output terminal at a time, the control signals on said output terminals appearing successively in a predetermined sequence; a plurality of pulse generators each adapted to produce a single output signal of uniform amplitude in response to receipt of a control signal; circuit means for connecting each of said pulse generators to a different one of said output terminals; a separate condition responsive element connected to each pulse generator for reducing the amplitude of said uniform amplitude signal; and indicator means connected dicertly to receive the signals from said condition responsive elements.

7. The combination of claim 6 wherein said pulse generators consist solely of resitsance, capacitance and inductance elements and the signals from said condition responsive elements are applied through isolation diodes to circuit terminals common to said indicator means without individual amplification thereof.

References Cited in the file of this patent

UNITED STATES PATENTS

| | | |
|---|---|---|
| 2,146,862 | Shumard | Feb. 14, 1939 |
| 2,403,561 | Smith | July 9, 1946 |
| 2,413,440 | Farrington | Dec. 31, 1946 |
| 2,548,345 | Butts | Apr. 10, 1951 |
| 2,573,175 | Bergen et al. | Oct. 30, 1951 |
| 2,781,505 | Grant | Feb. 12, 1957 |
| 2,810,099 | Townsend et al. | Oct. 15, 1957 |